United States Patent Office 2,992,159
Patented July 11, 1961

2,992,159
PROCESS OF INHIBITING PLANT VIRUSES
Robert P. Kahn, 4619 Glasgow Drive, Rockville, Md., and Thomas C. Allen, Jr., 519 Grant Place, Frederick, Md.
No Drawing. Filed Aug. 13, 1958, Ser. No. 754,905
15 Claims. (Cl. 167—30)
(Granted under Title 35, U.S. Code (1952), sec. 266)

The invention described herein may be manufactured and used by or for the Government of the United States of America for governmental purposes without the payment to us of any royalty thereon.

The infection of plants with various diseases which caues undesirable effects has long been a problem in the art. Attempts to inhibit viruses have been known and have produced varying degrees of success but, in general, have been either uneconomical or lack the general application desirable for an inhibitor.

The object of this invention is to provide a plant disease inhibitor of general application.

It is another object of this invention to provide an economical source of plant virus inhibitor.

A more particular object is to provide a plant virus infection inhibitor obtained in an extract from a common plant which may be applied, before or after infection, to a subject plant and inhibit virus infection.

An additional object is to prevent the spread of a virus infection by application of an inhibitor to whatever may come in contact with a plant.

It has been discovered that an extract from a rice plant contains an inhibitor which when applied to a plant inhibits either subsequent or prior virus infection.

The rice extract that comprises the present invention is obtained from the rice plant in the following ways and accordingly in denominated rice polish, rice sap or juice, or powder.

EXAMPLE I

As obtained from the rice grain: (1) the rice is cleaned mechanically; (2) aspiration with air stream removes dust beards, stems and lightly blighted grains; (3) the grain hulls are broken and partially removed by strong aspiration; (4) unhulled rice is separated from hulled rice (brown rice); (5) brown rice grains are rubbed against each other (scoured) to remove the bran, essentially only the outer layers are removed; (6) the scoured rice is then polished by brushing in a machine which consists of a vertically disposed wooden cylinder about 8' high by 4" diameter rotating in a fairly closely fitting stationary cylindrical screen, the entire surface of the wooden cylinder being covered with overlapped strips of leather laid the full length of the cylinder; by rotation with the lap the inner bran layers are removed and fall through the screen. These inner bran layers constitute the rice polish.

EXAMPLE II

Rice sap or juice was prepared by taking any one or a combination of rice flowers, roots, kernels, culms, leaves and stems and crushing and squeezing them while collecting the extract therefrom. Both fresh and frozen portions were used without any variation in inhibition being noticed.

EXAMPLE III

The pulp obtained from Example II is dried and ground to produce a fine powder. Similarly, a powder was obtained by drying and grinding a plant part, ex. leaves or stems.

The particular identity of the active ingredient has not as yet been determined, but is strongly believed to be either a protein or contain a protein. However, a test has been devised to determine the activity of the inhibitor. The rice polish, rice juice or sap, and/or powdered pulp are mixed in equal proportions with a tobacco mosaic virus (TMV) extract. The latter was prepared by squeezing the leaves or other plant parts of a TMV infected plant. The resultant mixture when applied to the leaves of a healthy pinto bean plant should produce no lesions (or a trace amount as compared to a TMV extract to which no rice extract is added), if the extract is physiologically active.

The manner of application and some of the various diseases inhibited are well illustrated in the following examples.

EXAMPLE IV

Tobacco mosaic virus inoculum was prepared by pressing or grinding fresh frozen TMV-1 infected tobacco leaves. These leaves had been inoculated with a single lesion isolate of the James Johnson strain. The resulting extract was diluted (1:10), poured into 150 cc. flasks, and placed in a freezer unit. Approximately 100 cc. of inoculum was used each week, thus requiring one flask per week. No loss of infectivity was observed during the storage of the inoculum in the deep freezer.

The local lesion host selected was pinto bean, from a Utah source, it being uniform and virus-free. One seed was planted in each ¼ gallon glazed pot and watered from the bottom. Seven to ten days after planting, plants were selected for inoculation on the basis of uniform size and shape of primary leaves.

Several hours prior to inoculation the selected plants were moved into a darkened room, watered, and growing points were cut off. The primary leaves were dusted evenly with a highly porous grade of diatomaceous earth, and the inoculum was then gently applied with a ground-glass spatula. In some experiments the inoculated leaves were rinsed with distilled water. Treatments were compared on half leaves, opposite leaves or whole plants depending on the nature of the experiment. The variation due to the 6-10 treatments was usually not more than 30 percent of the treatment means.

When lesions appeared, they first became evident two days after inoculation and were counted five days after inoculation. After the lesions were counted a few plants were always maintained in order to observe possible development of additional lesions. It was found that no new lesions ever developed on these plants.

The inhibitory action of rice juice or polish was evident when applied by dipping 1 of the 2 primary bean leaves into a Petri dish containing the juice or polish solutions either prior to or after TMV inoculation. Only the upper leaf surface was wetted, then immediately rinsed with distilled water. Control of lesion formation was clearly evident on the treated leaves compared to the untreated leaves.

When primary leaves were inoculated with TMV, the rice juice treated leaves had just as many lesions as undipped leaves when dipped 58 hours before TMV inoculation. However, 57 percent inhibition was obtained when beans were dipped in 10 percent rice polish three days before TMV application. Later tests showed 26 percent inhibition when leaves were dipped in rice polish as many as seven days prior to TMV inoculation. Again post inoculation dips proved rice polish the better inhibitor source with 14 percent inhibition occurring when treated two days after inoculation (lesions are already beginning to show). Rice juice caused no lowering in lesion number at 30 hours after TMV inoculation. These results show that the inhibitor or inhibitors present provide control of lesion formation before as well as after TMV inoculation.

The lower leaf surface was also dipped into rice juice and polish. This was effected 30 minutes before TMV application to the upper leaf surface and was immediately rinsed. Rice juice treated leaves provided 51 percent inhibition of the virus while those dipped in 10 percent rice polish provided 75 percent protection against lesions.

EXAMPLE V

Common bean mosaic virus was inoculated into pinto bean plants according to Example IV and the systemic symptoms produced by this virus were completely inhibited. The same result occurred when the inhibitor was mixed with the virus and applied to the healthy bean plants.

EXAMPLE VI

The local symptoms of tobacco necrosis virus on beans were completely inhibited when the virus was mixed with rice polish and applied on the leaves of healthy bean plants. The infected leaves dried up and died while treated leaves remained erect and green.

The relative activity of the various sources of the rice extract is set forth in the following table:

*Table 1.—Relative inhibition of TMV local lesions on pinto bean when mixed with rice derivatives (1:1) prior to inoculation[1]. Distilled water was used to rinse off the mixture after application.*

| Relative inhibition | Rice derivative |
|---|---|
| 100 | Fresh and frozen whole plants, fresh and frozen leaves, roots, polish, flowers, and ground kernels. |
| 98 | Dried leaves. |
| 83 | Culms. |
| 65 | Refined rice oil. |
| 61 | Polished rice. |
| 0 | Water control. |

[1] Many lesions were present on the small portion of leaves that were not killed by the crude rice oil suggesting little or no inhibition.

The effectiveness of the inhibitor has been found to vary according to the time of application of the inhibitor in relation to the virus inoculation. The following graph clearly shows this relationship.

RELATIVE INHIBITION

Time of inhibitor application before and after TMV inoculation (hours)

Relative inhibition with rice polish and juice when bean leaves were dipped in these solutions up to 3 days before TMV inoculation and as much as 2 days after inoculation.

EXAMPLE VII

Southern bean mosaic virus was mixed with rice polish and with rice juice and applied to healthy pinto bean leaves. The results indicated that the virus was 99 percent controlled by the rice polish while 82 percent by rice juice.

EXAMPLE VIII

Pod mottle virus symptoms consisted of only one necrotic vein on one of ten treated pinto bean leaves while untreated leaves died, the virus inoculum being applied as in Example IV and the leaves being treated with rice polish and rice juice by dipping the leaves in the inhibitor. Results were identical as compared to those in Example IV.

Rice juice from tops or roots lost all inhibitive action when diluted 1:200 with distilled water while rice polish slowly lost inhibitive power up to 1:5000. At 1:4000 dilution the rice polish inhibitor was found to be 40 percent active.

The manner of inhibitor application and mode of usage may be varied and is not limited to that set forth in Example IV. It has been found that a spray of the rice polish and juice is very effective, while the powder of Example III may be dusted on the plants with excellent results. Rain, dews or artificial irrigation are depended upon to extract the inhibitor from the powder. A mixture of 1 pound of powder in 100 gallons of water has been found to be particularly effective.

Moreover, the inhibitor might also be used to disinfect cutting implements that are used in the vegetative propagation of plants, for example, the blades used to cut potato tubers into seed pieces. Many viruses are transmitted from diseased to healthy plants by these tools. At present, the tools must be dipped in trisodium phosphate which has the objection of being alkaline, or dipped in alcohol and flamed which is hard on the cutting edges of these tools.

Further, many viruses are spread on the hands of workers, especially those that smoke or chew tobacco. A worker might wash his hands in rice polish extract while handling tomatoes to prevent the spread of tobacco mosaic virus.

A small percentage of the viruses are transmitted through the seed of plants or in the soil and possibly the virus infected seeds could be soaked in extract before planting, or the soil drenched in order to inhibit the viruses.

Since there is some evidence that the inhibitor may be injected into a plant stem and then protect the leaves of the plant suggesting that the inhibitor or some metabollic product of the plant produced under the influence of the inhibitor are translocated through the plant, one might be able to use a rice extract solution as a root dip prior to transplanting plants, such as tomatoes, so that the roots would take up the inhibitor before the plant is transplanted.

It should be abundantly clear that the invention has a wide scope and application to inhibit viruses on any plant that may be affected either before or after the infection occurs.

Although this description sets forth particular embodiments of the invention, it is obvious that many modifications are possible within the scope of this invention. It is intended that the scope of this invention be solely limited by the appended claims.

We claim:
1. The process of inhibiting tobacco mosaic virus, common bean mosaic virus, tobacco necrosis virus, and southern bean mosaic virus, comprising the application of undiluted rice extract to the desired portion of the plant wherein said rice extract is selected from the group consisting of rice inner bran, rice juice, powdered rice pulp, dried rice flower powder, dried rice root powder, dried rice kernel powder, dried rice culm powder, dried rice leaf powder, dried rice stem powder, ground whole rice plant, and any mixtures of the above.

2. The method of inhibiting the spread of tobacco mosaic virus, common bean mosaic virus, tobacco necrosis virus, on a plant comprising the application to these portions of farm implements and machinery and persons and other animals which will come into contact with said plant, a rice extract wherein said rice extract is selected from the group consisting of rice inner bran, rice juice, powdered rice pulp, dried rice flower powder, dried rice root powder, dried rice kernel powder, dried rice culm powder, dried rice leaf powder, dried rice stem powder, ground whole rice plant, and any mixtures of the above.

3. The process of inhibiting tobacco mosaic virus, common bean mosaic virus, tobacco necrosis virus, and southern bean mosaic virus, comprising the application of undiluted rice inner bran to the desired portion of the plant.

4. The process of inhibiting tobacco mosaic virus, common bean mosaic virus, tobacco necrosis virus, and southern bean mosaic virus, comprising the application of undiluted rice juice to the desired portion of the plant.

5. The process of inhibiting tobacco mosaic virus, common bean mosaic virus, tobacco necrosis virus, and southern bean mosaic virus, comprising the application of undiluted powdered rice pulp to the desired portion of the plant.

6. The process of inhibiting tobacco mosaic virus, common bean mosaic virus, tobacco necrosis virus, and southern bean mosaic virus, comprising the application of undiluted dried rice flower powder to the desired portion of the plant.

7. The process of inhibiting tobacco mosaic virus, common bean mosaic virus, tobacco necrosis virus, and southern bean mosaic virus, comprising the application of undiluted dried rice root powder to the desired portion of the plant.

8. The process of inhibiting tobacco mosaic virus, common bean mosaic virus, tobacco necrosis virus, and southern bean mosaic virus, comprising the application of undiluted dried rice kernel powder to the desired portion of the plant.

9. The process of inhibiting tobacco mosaic virus, common bean mosaic virus, tobacco necrosis virus, and southern bean mosaic virus, comprising the application of undiluted dried rice culm powder to the desired portion of the plant.

10. The process of inhibiting tobacco mosaic virus, common bean mosaic virus, tobacco necrosis virus, and southern bean mosaic virus, comprising the application of undiluted dried rice leaf powder to the desired portion of the plant.

11. The process of inhibiting tobacco mosaic virus, common bean mosaic virus, tobacco necrosis virus, and southern bean mosaic virus, comprising the application of undiluted dried rice stem powder to the desired portion of the plant.

12. The process of inhibiting tobacco mosaic virus, common bean mosaic virus, tobacco necrosis virus, and southern bean mosaic virus, comprising the application of undiluted ground whole rice plant to the desired portion of the plant.

13. The process of inhibiting tobacco mosaic virus, common bean mosaic virus, tobacco necrosis virus, and southern bean mosaic virus, comprising the application of any mixture of rice inner bran, rice juice, powdered rice pulp, dried rice flower powder, dried rice root powder, dried rice kernel powder, dried rice culm powder, dried rice leaf powder, dried rice stem powder, and ground whole rice plant.

14. The process of inhibiting tobacco mosaic virus, common bean mosaic virus, tobacco necrosis virus, and southern bean mosaic virus, comprising the application of rice inner bran and distilled water mixture to the desired portion of the plant, wherein there is no less than one part rice inner bran for every 4000 parts of distilled water.

15. The process of inhibiting tobacco mosaic virus, common bean mosaic virus, tobacco necrosis virus, and southern bean mosaic virus, comprising the application of rice juice and distilled water mixture to the desired portion of the plant, wherein there is no less than one part rice juice for every 175 parts of distilled water.

References Cited in the file of this patent

UNITED STATES PATENTS 2,713,542    D'Altri _____ July 19, 1955

OTHER REFERENCES

Chemical Abstracts, Tsuchiija et al., vol. 48, p. 11083.
Handbook of Toxicology, vol. II, Antibiotics, Entry 231, "Oryzasizine," p. 133, 1957.
Webster's New International Dictionary, 2nd ed., unabridged, Merriam Co., 1940, p. 2143.
Handbook of Toxicology, vol. II, Antibiotics, Entry 319, "Trichotecin," p. 187, 1957.